US012698715B2

(12) United States Patent
Kray et al.

(10) Patent No.: US 12,698,715 B2
(45) **Date of Patent: \*Aug. 4, 2026**

(54) ROTOR BLADE WITH FRANGIBLE SPAR FOR A GAS TURBINE ENGINE

(71) Applicant: General Electric Company, Schenectady, NY (US)

(72) Inventors: Nicholas Joseph Kray, Mason, OH (US); Nitesh Jain, Bangalore (IN)

(73) Assignee: General Electric Company, Evendale, OH (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/530,937

(22) Filed: Dec. 6, 2023

(65) Prior Publication Data

US 2025/0334050 A1 Oct. 30, 2025

Related U.S. Application Data

(62) Division of application No. 17/488,836, filed on Sep. 29, 2021, now Pat. No. 11,879,354.

(51) Int. Cl.
| | |
|---|---|
| *F01D 5/14* | (2006.01) |
| *F01D 5/28* | (2006.01) |
| *F01D 21/04* | (2006.01) |
| *F02K 3/06* | (2006.01) |

(52) U.S. Cl.
CPC ................ *F01D 5/147* (2013.01); *F02K 3/06* (2013.01); *F05D 2220/323* (2013.01); *F05D 2240/301* (2013.01); *F05D 2300/50* (2013.01); *F05D 2300/60* (2013.01)

(58) Field of Classification Search
CPC .......... F01D 5/147; F01D 5/284; F01D 5/189; F01D 5/3084; F01D 5/186; F01D 5/20; F01D 21/045; F01D 5/282; F01D 5/30; F01D 5/18; F01D 5/14; F01D 11/008; F01D 5/3007; F01D 5/188; F05D 2300/6033; F05D 2300/50; F05D 2300/60; F05D 2300/603; F05D 2220/323; F05D 2230/51; F05D 2240/301; B23P 15/04; F04D 29/324; F04D 29/023; F04D 29/388; F02K 3/06
See application file for complete search history.

(56) References Cited

U.S. PATENT DOCUMENTS

| | | | |
|---|---|---|---|
| 2,396,625 A | | 3/1946 | Watter |
| 5,372,005 A | | 12/1994 | Lawler |
| 5,634,771 A | | 6/1997 | Howard |
| 7,080,971 B2 * | | 7/2006 | Wilson ...................... F01D 5/20 |
| | | | 416/96 A |

(Continued)

FOREIGN PATENT DOCUMENTS

| | | |
|---|---|---|
| CN | 106481364 A | 3/2017 |
| CN | 109973415 A | 7/2019 |
| CN | 115653695 A | 1/2023 |

*Primary Examiner* — Eric J Zamora Alvarez
(74) *Attorney, Agent, or Firm* — McGarry Bair PC

(57) ABSTRACT

A rotor blade for a gas turbine engine is provided. The rotor blade includes a blade body formed of a first material; and a spar within a portion of the blade body, the spar formed of a second material that is different than the first material, the spar having an elongate body including a notch. The notch, weakened geometric feature, or other reduction in cross-section defines a frangible portion of the spar that is used to control a fracture of a rotor blade.

20 Claims, 4 Drawing Sheets

(56)     References Cited

U.S. PATENT DOCUMENTS

| | | | |
|---|---|---|---|
| 7,789,621 B2 | 9/2010 | Dierksmeier et al. | |
| 8,033,790 B2 | 10/2011 | Vance | |
| 8,075,274 B2 | 12/2011 | Carvalho | |
| 8,206,109 B2 | 6/2012 | Morgan | |
| 8,573,936 B2 | 11/2013 | Lafont | |
| 9,121,287 B2 | 9/2015 | Weisse et al. | |
| 9,416,668 B2* | 8/2016 | Muron | F04D 29/324 |
| 9,506,350 B1 | 11/2016 | Memmen | |
| 10,731,470 B2 | 8/2020 | Crall | |
| 11,674,399 B2 | 6/2023 | Ganiger | |
| 2015/0176426 A1 | 6/2015 | Tutaj et al. | |
| 2017/0058680 A1 | 3/2017 | Chouhan | |
| 2017/0363062 A1 | 12/2017 | Merzhaeuser | |
| 2019/0136697 A1 | 5/2019 | Foster | |
| 2020/0116027 A1 | 4/2020 | Jain et al. | |
| 2020/0116028 A1 | 4/2020 | Kray | |
| 2020/0200020 A1* | 6/2020 | Wong | F01D 5/187 |
| 2022/0074307 A1* | 3/2022 | Kray | F01D 5/284 |
| 2022/0333492 A1* | 10/2022 | Kray | F01D 5/282 |

* cited by examiner

ROTOR BLADE WITH FRANGIBLE SPAR FOR A GAS TURBINE ENGINE

CROSS-REFERENCE TO RELATED APPLICATIONS

This application is a divisional application of U.S. application Ser. No. 17/488,836 filed Sep. 29, 2021, now U.S. Pat. No. 11,879,354, issued Jan. 23, 2024, which claims priority to Indian Patent Application number 202111034691 filed on Aug. 2, 2021, which are hereby incorporated by reference in their entirety.

FIELD

The present subject matter relates generally to a gas turbine engine, or more particularly to a rotor blade of a gas turbine engine.

BACKGROUND

A turbofan engine typically includes a fan, a nacelle, and a core gas turbine engine positioned within the nacelle. During operation of the turbofan, the core gas turbine engine drives or otherwise rotates the rotor blades of the fan relative to the nacelle. The rotation of the rotor blades, in turn, generates a flow of pressurized air, which may support the operation of the core gas turbine and/or be used as propulsive thrust for propelling an aircraft.

In general, a turbofan engine may have a closed rotor configuration or an open rotor configuration. More specifically, the fan is positioned within the nacelle in the closed rotor configuration. Conversely, in the open rotor configuration, the fan is positioned outside of the nacelle. In this respect, the open rotor configuration generally permits the use of a larger fan than the closed rotor configuration. However, excessive loading can cause a fan rotor blade to break off at a root section resulting in a large broken off fragment.

Thus, it is desirable to control a fracture of a rotor blade.

BRIEF DESCRIPTION

Aspects and advantages of the invention will be set forth in part in the following description, or may be obvious from the description, or may be learned through practice of the invention.

In one exemplary embodiment of the present disclosure, a rotor blade for a gas turbine engine is provided. The rotor blade includes a blade body formed of a first material; and a spar within a portion of the blade body, the spar formed of a second material that is different than the first material, the spar having an elongate body including a notch.

In certain exemplary embodiments the notch defines a frangible portion of the spar.

In certain exemplary embodiments the elongate body of the spar has a first thickness and the frangible portion has a second thickness that is less than the first thickness.

In certain exemplary embodiments the second thickness of the frangible portion is at least 10% less than the first thickness of the elongate body.

In certain exemplary embodiments a stiffness of the second material is greater than a stiffness of the first material.

In certain exemplary embodiments the elongate body of the spar includes a plurality of notches spaced along the elongate body.

In certain exemplary embodiments the plurality of notches include a first notch and a second notch and the rotor blade includes a root section, wherein the first notch is located a first distance in a radial direction from the root section and the second notch is located a second distance in the radial direction from the root section, wherein the second distance is greater than the first distance.

In certain exemplary embodiments the blade body defines a periphery and the spar is disposed within the blade body adjacent the periphery.

In certain exemplary embodiments the rotor blade includes a first spar within a first portion of the blade body, the first spar formed of the second material that is different than the first material, the first spar having a first spar elongate body including a first spar notch; and a second spar within a second portion of the blade body, the second spar formed of the second material that is different than the first material, the second spar having a second spar elongate body including a second spar notch.

In certain exemplary embodiments the first spar notch and the second spar notch are aligned.

In certain exemplary embodiments the first spar notch and the second spar notch are staggered.

In certain exemplary embodiments with a breaking force applied to the rotor blade, the spar fractures at the frangible portion.

In certain exemplary embodiments the rotor blade is positioned within one of a fan, a compressor section, or a turbine section.

In another exemplary embodiment of the present disclosure, a rotor blade for a gas turbine engine is provided. The rotor blade includes a blade body formed of a first material; a first spar within a first portion of the blade body, the first spar formed of a second material that is different than the first material, the first spar having a first spar elongate body including a first spar notch; and a second spar within a second portion of the blade body, the second spar formed of the second material that is different than the first material, the second spar having a second spar elongate body including a second spar notch.

In certain exemplary embodiments the first spar notch defines a first frangible portion of the first spar and the second spar notch defines a second frangible portion of the second spar.

In certain exemplary embodiments the first spar elongate body and the second spar elongate body have a first thickness and the first frangible portion and the second frangible portion have a second thickness that is less than the first thickness.

In certain exemplary embodiments the second thickness is at least 10% less than the first thickness.

In certain exemplary embodiments a stiffness of the second material is greater than a stiffness of the first material.

In certain exemplary embodiments the first spar elongate body includes a plurality of first spar notches spaced along the first spar elongate body.

In certain exemplary embodiments the second spar elongate body includes a plurality of second spar notches spaced along the second spar elongate body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
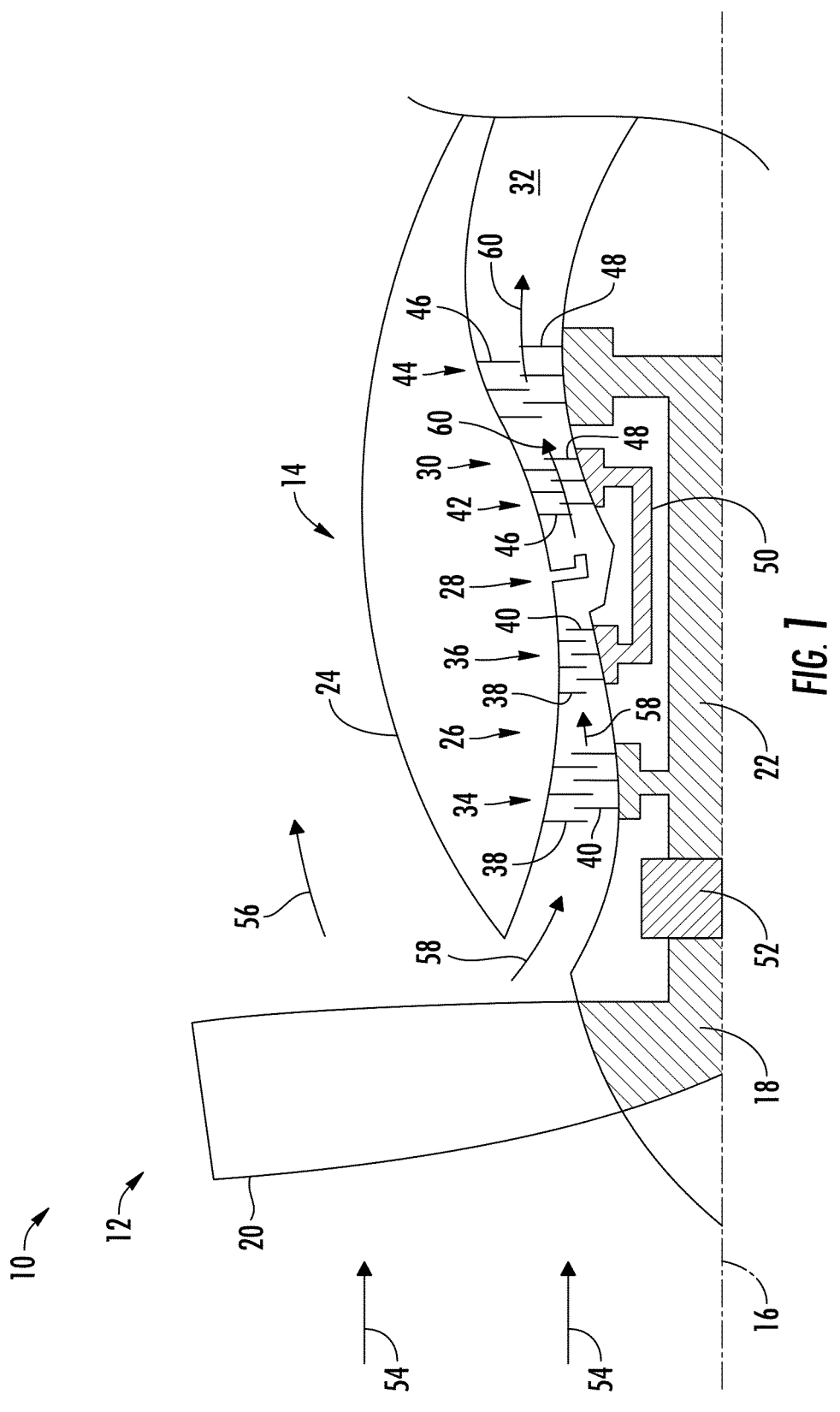
FIG. 1 is a schematic, cross-sectional view of an exemplary gas turbine engine in accordance with exemplary embodiments of the present disclosure.
Figure 3:
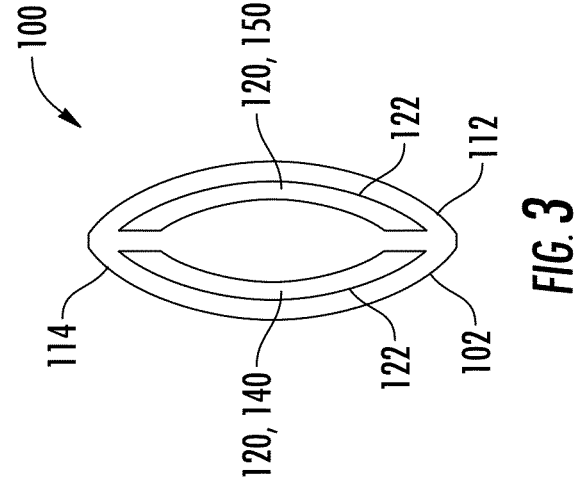
FIG. 3 is a cross-sectional view of the rotor blade taken generally about line 3-3 in FIG. 2 in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A rotor blade of the present disclosure includes a blade body formed of a first material and a spar within a portion of the blade body, the spar formed of a second material that is different than the first material, the spar having an elongate body including a notch. The notch or notches of the elongate body of the spar respectively define a plurality of frangible portions of the spar. These notches can have any shape or size, e.g., any weakened geometric feature, to define a frangible portion of the spar to control a fracture of a rotor blade as described herein.

For example, the notches within a spar of the present disclosure have a geometry as described herein whereby sufficient force, e.g., a breaking force, applied to a notch, bending force, e.g., a breaking force, applied adjacent a notch will cause the spar to fracture at the notch, or other breaking forces applied to a notch will cause the spar to fracture at the notch. While described as having notches to facilitate controlled fracturing of a rotor blade, "notch" is used as a general term in this document to indicate any weakened geometric feature or other reduction in cross-section. In other words, with a breaking force applied to the rotor blade, the spar fractures at the notch. The notches define frangible portions of the spar to control a fracture of a rotor blade.

The frangible portions of a spar of the present disclosure control a fracture of a rotor blade by controlling fracturing of the spar of the rotor blade into multiple smaller pieces at each of the notches. For example, a spar of the rotor blade may break into multiple sections along each of the notches. In this manner, a rotor blade of the present disclosure is broken in a controlled manner into multiple smaller pieces all the way along a radial direction from a root section to a tip section of the rotor blade. This prevents a rotor blade from breaking at the root section into a single large broken off fragment.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is configured as an open rotor or unducted turbofan engine. However, in alternative embodiments, the engine 10 may be configured as a closed rotor or ducted turbofan engine, a turbojet engine, a turboprop engine, a turboshaft gas turbine engine, or any other suitable type of gas turbine engine.

In general, the engine 10 includes a fan 12 and a core engine 14 extending along an axial centerline 16. More specifically, the fan 12 may include a fan rotor 18 and a plurality of fan rotor blades 20 (one is shown) coupled to the fan rotor 18. In this respect, the fan rotor blades 20 are spaced apart from each along the circumference of the fan rotor 18 and extend outward from the rotor 18. Moreover, the core engine 14 may be positioned downstream from the fan 12 along the axial centerline 16. As shown, the core engine 14 is rotatably coupled to the fan rotor 18 via a low-pressure (LP) shaft 22, thereby permitting the core engine 14 to rotate the fan 12.

In several embodiments, the engine 10 also includes a nacelle or outer casing 24 surrounding various components of the core engine 14. More specifically, the nacelle 24 generally surrounds or encases, in serial flow order, a compressor section 26, a combustion section 28, a turbine section 30, and an exhaust section 32. For example, in some embodiments, the compressor section 26 may include a low-pressure (LP) compressor 34 and a high-pressure (HP) compressor 36 positioned downstream from the LP compressor 34 along the axial centerline 16. Each compressor 34, 36 may, in turn, include one or more rows of stator vanes 38 interdigitated with one or more rows of compressor rotor blades 40. Moreover, in some embodiments, the turbine section 30 includes a high-pressure (HP) turbine 42 and a low-pressure (LP) turbine 44 positioned downstream from the HP turbine 42 along the axial centerline 16. Each turbine 42, 44 may, in turn, include one or more rows of stator vanes 46 interdigitated with one or more rows of turbine rotor blades 48.

Additionally, the engine 10 includes the low-pressure (LP) shaft 22 and a high pressure (HP) shaft 50 positioned concentrically around the LP shaft 22. In such embodiments, the HP shaft 50 rotatably couples the rotor blades 48 of the HP turbine 42 and the rotor blades 40 of the HP compressor 36 such that rotation of the HP turbine rotor blades 48 rotatably drives HP compressor rotor blades 40. As shown, the LP shaft 22 is directly coupled to the rotor blades 48 of the LP turbine 44 and the rotor blades 40 of the LP compressor 34. Furthermore, the LP shaft 22 is coupled to the fan 12 via a gearbox 52. In this respect, the rotation of the LP turbine rotor blades 48 rotatably drives the LP compressor rotor blades 40 and the fan blades 20.

In several embodiments, the engine 10 may generate thrust to propel an aircraft. More specifically, during operation of the engine 10, the fan 12 pressurizes incoming air (indicated by arrows 54). In this respect, a first portion (indicated by arrow 56) of the pressurized air 54 flows around the nacelle 24 (i.e., external to the nacelle 24) toward the rear of the engine 10. Conversely, a second portion (indicated by arrow 58) of the air 54 is directed into the compressor section 26 of the core engine 14. The second portion 58 of the air 54 first flows through the LP compressor 34 in which the rotor blades 40 therein progressively compress the second portion 58 of the air 54. Next, the second portion 58 of the air 54 flows through the HP compressor 36 in which the rotor blades 40 therein continue progressively compressing the second portion 58 of the air 54. The compressed second portion 58 of the air 54 is subsequently delivered to the combustion section 28. In the combustion section 28, the second portion 58 of the air 54 mixes with fuel and burns to generate high-temperature and high-pressure combustion gases 60. Thereafter, the combustion gases 60 flow through the HP turbine 42 in which the HP turbine rotor blades 48 extract a first portion of kinetic and/or thermal energy therefrom. This energy extraction rotates the HP shaft 50, thereby driving the HP compressor 36. The combustion gases 60 then flow through the LP turbine 44 in which the LP turbine rotor blades 48 extract a second portion of kinetic and/or thermal energy therefrom. This energy extraction rotates the LP shaft 22, thereby driving the LP compressor 40 and the fan 12 via the gearbox 52. The combustion gases 60 then exit the core engine 14 through the exhaust section 32.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
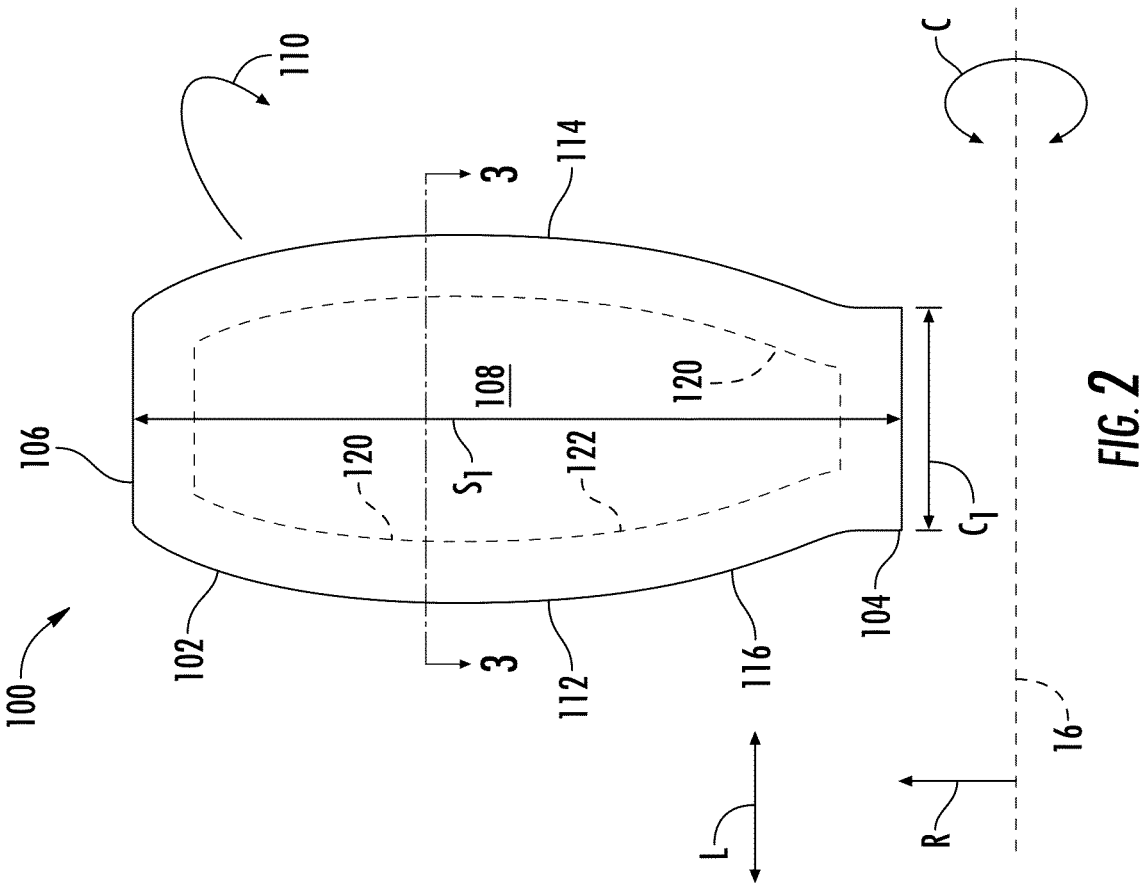
FIG. 2 is a side elevation view of a rotor blade of a gas turbine engine in accordance with an exemplary embodiment of the present disclosure.

FIGS. 2-6 illustrate exemplary embodiments of the present disclosure. FIG. 2 is a side elevation view of a rotor blade 100 in accordance with an exemplary embodiment of the present disclosure, which may be incorporated into the engine 10 in place of any of the fan rotor blades 20, the compressor rotor blades 40, and/or the turbine rotor blades 48. As shown, the rotor blade 100 defines a longitudinal direction L, a radial direction R, and a circumferential direction C. In general, the longitudinal direction L extends parallel to the axial centerline 16 of the engine 10, the radial direction R extends generally orthogonal to the axial centerline 16, and the circumferential direction C extends generally concentrically around the axial centerline 16.

Referring to FIGS. 2-6, in exemplary embodiments, the rotor blade 100 includes a blade body 102 and a spar 120 disposed within a portion of the blade body 102. The blade body 102 extends from a root section 104 to a tip 106 along the radial direction R. Furthermore, the blade body 102 includes a pressure-side surface 108 and an opposing suction-side surface 110. In this respect, the pressure side surface 108 and the suction side surface 110 are joined together or interconnected at a leading edge 112 of the blade body 102 and a trailing edge 114 of the blade body 102. The blade body 102 of the rotor blade 100 defines a periphery 116.

Referring to FIG. 2, each rotor blade 100 has a span, or span dimension, "S1" defined as the radial distance from the root 104 to the tip 106, and a chord, or chord dimension, "C1" defined as the length of an imaginary straight line connecting the leading edge 112 and the trailing edge 114. Depending on the specific design of the rotor blade 100, its chord C1 may be different at different locations along the span S1. In one embodiment, a relevant measurement is the chord C1 at the root 104 of the rotor blade 100.

Additionally, as will be described below, the root section 104 secures the rotor blade 100 to a rotor disk (not shown) coupled to the LP shaft 22 (FIG. 1) or HP shaft 50 (FIG. 1). However, in alternative exemplary embodiments, the rotor blade 100 may have any other suitable configuration. For example, in one embodiment, the rotor blade 100 may include a platform positioned between the blade body 102 and the root section 104 along the radial direction R.

Referring to FIGS. 2-6, in exemplary embodiments, the blade body 102 is formed of a first material and the spar 120 disposed within a portion of the blade body 102 is formed of a second material that is different than the first material.

In an exemplary embodiment, the spar 120 is made of a material that is stronger, stiffer, and more rigid than the material of the blade body 102. For example, the spar 120 forms the strongest and most rigid portions of the rotor blade 100. Thus, an advantage of integrating the spar 120 into blade body 102 is that spar 120 reinforces the strength of blade body 102. In this manner, the spar 120 carries most of the load of the rotor blade 100. In exemplary embodiments, the spar 120 may be formed of laminate composites, woven composites, braided composites, or metallics such as aluminum or titanium, though it is contemplated that other materials may be used.

In an exemplary embodiment, the blade body 102 is made of a material that is softer than the material of the spar 120. For example, the blade body 102 may be formed of braided or woven composite materials, though it is contemplated that other materials may be used.

In exemplary embodiments, a portion of the blade body 102 and/or a portion of the spar 120 may be formed from any suitable composite material, e.g., suitable materials used to form a matrix of a final blade body 102 or spar 120 and/or suitable materials that comprise the final blade body 102 or spar 120. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC include, but are not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a matrix material for a MMC include, but are not limited to aluminum, titanium, and combinations thereof. For example, a MMC may be formed from powder metals such as, but not limited to, aluminum powder or titanium powder capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load carrying element.

Figures 4, 5:
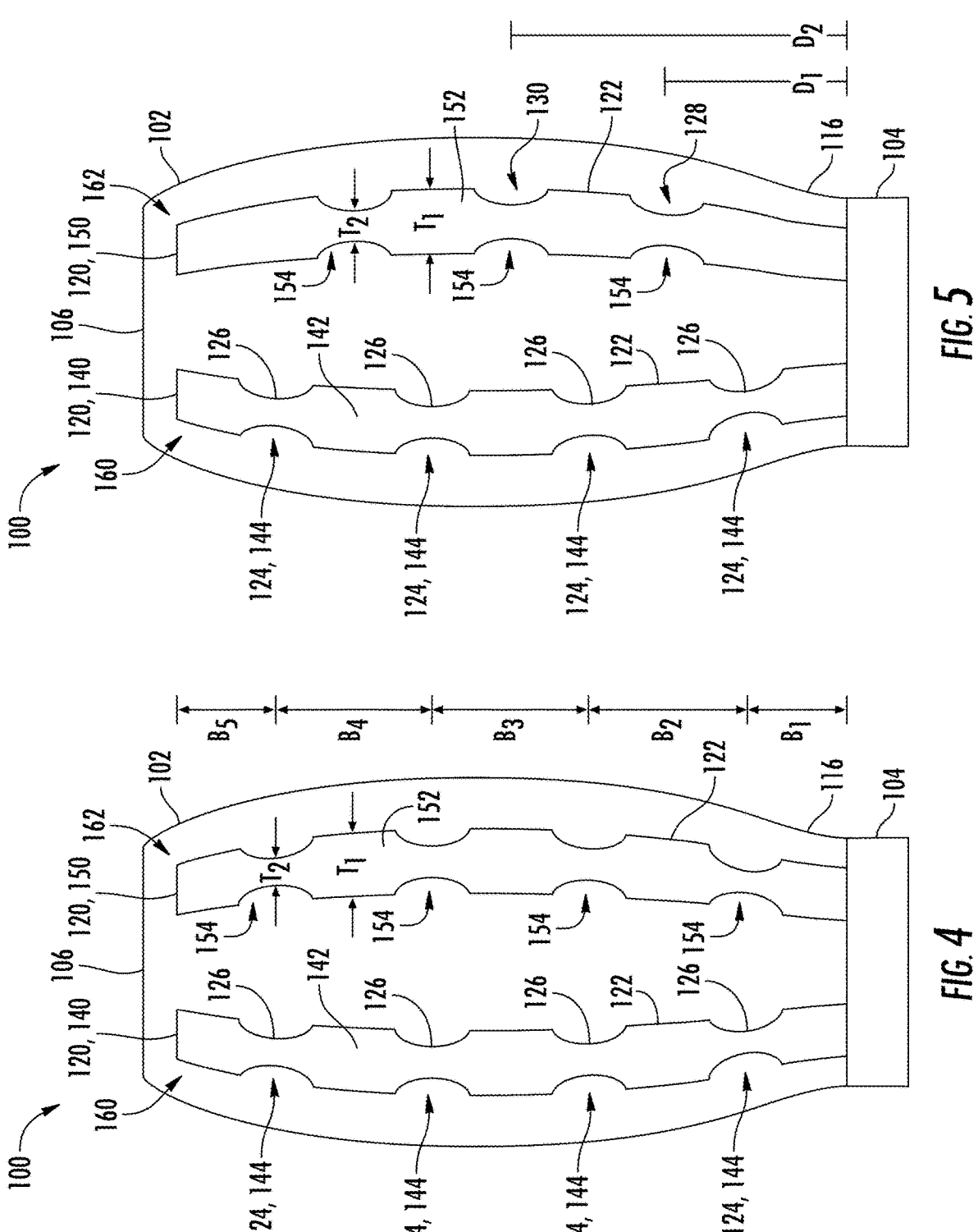
FIG. 4 is a side cross-sectional view of the rotor blade in accordance with an exemplary embodiment of the present disclosure.
FIG. 5 is a side cross-sectional view of the rotor blade in accordance with another exemplary embodiment of the present disclosure.
Figure 6:
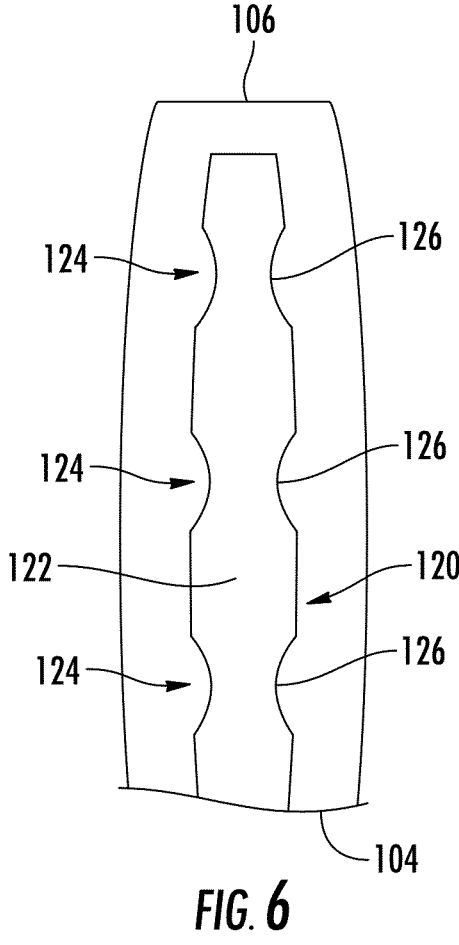
FIG. 6 is a side cross-sectional view of the rotor blade in accordance with an exemplary embodiment of the present disclosure.

Referring to FIGS. 2-6, the spar 120 includes an elongate body 122 including a notch 124 (FIGS. 4-6). In one exemplary embodiment, the elongate body 122 of the spar 120 includes a plurality of notches 124 spaced along the elongate body 122. It is contemplated that other configurations of notches 124 within the elongate body 122 of the spar 120, with a varying number of notches 124, may be used in accordance with the present disclosure to control a fracture of a rotor blade 100 as described herein.

The elongate body 122 of the spar 120 includes a plurality of notches 124 that respectively define a plurality of frangible portions 126 of the spar 120. In an exemplary embodiment, the notches 124 comprise generally U-shaped notches oriented substantially transverse to a longitudinal axis extending in the radial direction R of the elongate body 122 of the spar 120. It is contemplated that other shapes and sizes of notches 124 may be used. For example, notches 124 can have any other shapes or sizes, e.g., any weakened geometric feature, to define a frangible portion 126 of the spar 120 to control a fracture of a rotor blade 100 as described herein.

In an exemplary embodiment, as shown particularly in FIG. 5, the plurality of notches 124 include a first notch 128 and a second notch 130 and the first notch 128 is located a first distance D1 in the radial direction R from the root section 104 of the rotor blade 100 and the second notch 130 is located a second distance D2 in the radial direction R from the root section 104 of the rotor blade 100, wherein the second distance D2 is greater than the first distance D1. It is contemplated that any number of notches 124 within the elongate body 122 of spar 120 may be used.

Referring to FIG. 4, the elongate body 122 of the spar 120 has a first thickness T1 in portions that are not notched, i.e., non-frangible portions, and the frangible portion 126 of the elongate body 122 has a second thickness T2 that is less than the first thickness T1. In an exemplary embodiment, T1 is the maximum thickness of the spar 120 while T2 is the minimum thickness of the spar 120. Particularly in embodiments having a plurality of notches 124 radially spaced along the elongate body 122, it may be appreciated that the non-frangible portions of the elongate body 122 may have different thicknesses T1 along the radial direction R of the spar 120, and the frangible portions 126 may likewise have different thicknesses T2 along the radial direction R of the spar 120. In such embodiments, the thickness T2 of each frangible portion 126 is less than the thicknesses T1 of the non-frangible portions adjacent the frangible portion 126. In one exemplary embodiment, the second thickness T2 of the frangible portion 126 is at least 10% less than the first thickness T1 of the elongate body 122. In another exemplary embodiment, the second thickness T2 of the frangible portion 126 is at least 15% less than the first thickness T1 of the elongate body 122. In another exemplary embodiment, the second thickness T2 of the frangible portion 126 is at least 20% less than the first thickness T1 of the elongate body 122. In another exemplary embodiment, the second thickness T2 of the frangible portion 126 is at least 25% less than the first thickness T1 of the elongate body 122. In another exemplary embodiment, the second thickness T2 of the frangible portion 126 is at least 30% less than the first thickness T1 of the elongate body 122. It is contemplated that other shapes and sizes of frangible portions 126 may be used. For example, frangible portions 126 can have any other shapes or sizes, e.g., any weakened geometric feature, to define a frangible portion 126 of the spar 120 to control a fracture of a rotor blade 100 as described herein. The reduced thickness sections of the frangible portions 126 can be in a chord direction, through-thickness direction, both of these directions, or other direction to form a weakened geometric feature.

In exemplary embodiments, notches 124 are sufficiently deep to form frangible portions 126 whereby sufficient force, e.g., a breaking force, applied to a frangible portion 126 will cause spar 120 to fracture at the frangible portion 126. Other forces such as a bending force, e.g., a breaking force, applied adjacent a frangible portion 126 will cause spar 120 to fracture at the frangible portion 126, or other forces applied to a frangible portion 126 will cause spar 120 to fracture at the frangible portion 126. While described as having notches 124 to facilitate controlled fracturing of a rotor blade 100, "notch" is used as a general term in this document to indicate any weakened geometric feature or other reduction in cross-section.

In an exemplary embodiment, the spar 120 is disposed within the blade body 102 adjacent the periphery 116 of the blade body 102. In this manner, the stiffest portion of the rotor blade 100, i.e., the spar 120, extends as far out toward the exterior surface or periphery 116 of the blade body 102.

Referring to FIG. 4, in an exemplary embodiment, the rotor blade 100 includes a first spar 140 and a second spar 150. The first spar 140 is disposed within a first portion 160 of the blade body 102. As described above, the first spar 140 is formed of a second material that is different than the first material of the blade body 102. The first spar 140 includes a first spar elongate body 142 including a first spar notch 144. The first spar 140 and first spar notch 144 can be configured as described herein with respect to spar 120 and notch 124.

The second spar 150 is disposed within a second portion 162 of the blade body 102. As described above, the second spar 150 is formed of a second material that is different than the first material of the blade body 102. The second spar 150 includes a second spar elongate body 152 including a second spar notch 154. The second spar 150 and second spar notch 154 can be configured as described herein with respect to spar 120 and notch 124. It is contemplated that any number of spars 120 within the blade body 102 of rotor blade 100 may be used.

Referring to FIG. 4, in one exemplary embodiment, the first spar notch 144 of the first spar 140 and the second spar notch 154 of the second spar 150 are aligned.

Referring to FIG. 5, in another exemplary embodiment, the first spar notch 144 of the first spar 140 and the second spar notch 154 of the second spar 150 are misaligned or staggered. It may be appreciated that the spars 140, 150 of FIGS. 4 and 5 may each have a single notch 144, 154 or a plurality of notches 144, 154, and the plurality of notches 144, 154 may be equally or unequally spaced apart in the radial direction R. Additionally, the number of first spar notches 144 may be the same or different than the number of second spar notches 154.

It is contemplated that other configurations of the first spar notch 144 of the first spar 140 and the second spar notch 154 of the second spar 150 may be used in accordance with the present disclosure to control a fracture of a rotor blade 100 as described herein.

The frangible portions 126 within spar 120 of the present disclosure have a geometry as described herein whereby sufficient force, e.g., a breaking force or other force, applied to a frangible portion 126 will cause spar 120 to fracture at the frangible portion 126. While described as having notches 124 to facilitate controlled fracturing of a rotor blade 100, "notch" is used as a general term in this document to indicate any weakened geometric feature or other reduction in cross-section. In other words, with a breaking force applied to the rotor blade 100, the spar 120 fractures at the frangible portion 126. In this manner, the notches 124 define frangible portions 126 of the spar 120 to control a fracture of a rotor blade 100.

The frangible portions 126 of spar 120 of the present disclosure control a fracture of a rotor blade 100 by controlling fracturing of the spar 120 of the rotor blade 100 into multiple smaller pieces at each of the notches 124. For example, referring to FIG. 4, in an exemplary embodiment, spar 120 of rotor blade 100 may break into multiple sections along each of the notches 124, e.g., the spar 120 may break into a first broken section B1, a second broken section B2, a third broken section B3, a fourth broken section B4, and a fifth broken section B5. In this manner, a rotor blade 100 of the present disclosure is broken in a controlled manner into multiple smaller pieces all the way along the radial direction R from root section 104 to tip 106 of rotor blade 100. This prevents a rotor blade from breaking at the root section into a single large broken off fragment.

In an exemplary aspect of the present disclosure, a method is provided for controlling a fracture of a rotor blade for a gas turbine engine. The method includes providing a rotor blade comprising a blade body formed of a first material and a spar within a portion of the blade body, the spar formed of a second material that is different than the first material, the spar having an elongate body including a notch; and receiving a breaking force at the rotor blade that fractures the spar at the notch.

Further aspects of the invention are provided by the subject matter of the following clauses:

1. A rotor blade for a gas turbine engine, the rotor blade comprising: a blade body formed of a first material; and a spar within a portion of the blade body, the spar formed of a second material that is different than the first material, the spar having an elongate body including a notch.

2. The rotor blade of any preceding clause, wherein the notch defines a frangible portion of the spar.

3. The rotor blade of any preceding clause, wherein the elongate body of the spar has a first thickness and the frangible portion has a second thickness that is less than the first thickness.

4. The rotor blade of any preceding clause, wherein the second thickness of the frangible portion is at least 10% less than the first thickness of the elongate body.

5. The rotor blade of any preceding clause, wherein a stiffness of the second material is greater than a stiffness of the first material.

6. The rotor blade of any preceding clause, wherein the elongate body of the spar includes a plurality of notches spaced along the elongate body.

7. The rotor blade of any preceding clause, wherein the plurality of notches include a first notch and a second notch and the rotor blade includes a root section, wherein the first notch is located a first distance in a radial direction from the root section and the second notch is located a second distance in the radial direction from the root section, wherein the second distance is greater than the first distance.

8. The rotor blade of any preceding clause, wherein the blade body defines a periphery and the spar is disposed within the blade body adjacent the periphery.

9. The rotor blade of any preceding clause, further comprising: a first spar within a first portion of the blade body, the first spar formed of the second material that is different than the first material, the first spar having a first spar elongate body including a first spar notch; and a second spar within a second portion of the blade body, the second spar formed of the second material that is different than the first material, the second spar having a second spar elongate body including a second spar notch.

10. The rotor blade of any preceding clause, wherein the first spar notch and the second spar notch are aligned.

11. The rotor blade of any preceding clause, wherein the first spar notch and the second spar notch are staggered.

12. The rotor blade of any preceding clause, wherein, with a breaking force applied to the rotor blade, the spar fractures at the frangible portion.

13. The rotor blade of any preceding clause, wherein the rotor blade is positioned within one of a fan, a compressor section, or a turbine section.

14. A rotor blade for a gas turbine engine, the rotor blade comprising: a blade body formed of a first material; a first spar within a first portion of the blade body, the first spar formed of a second material that is different than the first material, the first spar having a first spar elongate body including a first spar notch; and a second spar within a second portion of the blade body, the second spar formed of the second material that is different than the first material, the second spar having a second spar elongate body including a second spar notch.

15. The gas turbine engine of any preceding clause, wherein the first spar notch defines a first frangible portion of the first spar and the second spar notch defines a second frangible portion of the second spar.

16. The gas turbine engine of any preceding clause, wherein the first spar elongate body and the second spar elongate body have a first thickness and the first frangible portion and the second frangible portion have a second thickness that is less than the first thickness.

17. The gas turbine engine of any preceding clause, wherein the second thickness is at least 10% less than the first thickness.

18. The gas turbine engine of any preceding clause, wherein a stiffness of the second material is greater than a stiffness of the first material.

19. The gas turbine engine of any preceding clause, wherein the first spar elongate body includes a plurality of first spar notches spaced along the first spar elongate body.

20. The gas turbine engine of any preceding clause, wherein the second spar elongate body includes a plurality of second spar notches spaced along the second spar elongate body.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A rotor blade for a gas turbine engine, the rotor blade comprising:
a blade body formed of a first material;
a first spar within a first portion of the blade body, the first spar formed of a second material that is different than the first material, the first spar having a first spar elongate body including a first spar notch, wherein the first spar notch defines a first frangible portion of the first spar; and
a second spar within a second portion of the blade body, the second spar formed of the second material that is different than the first material, the second spar having a second spar elongate body including a second spar notch, wherein the second spar notch defines a second frangible portion of the second spar.

2. The gas turbine engine of claim 1, wherein the first spar elongate body has a first thickness and the first frangible portion has a second thickness that is less than the first thickness.

3. The gas turbine engine of claim 2, wherein the second thickness is at least 10% less than the first thickness.

4. The gas turbine engine of claim 1, wherein a stiffness of the second material is greater than a stiffness of the first material.

5. The rotor blade of claim 1, wherein the first spar and the second spar each comprise laminate composites, woven composites, or braided composites.

6. The rotor blade of claim 1, wherein the blade body defines a periphery and the first spar and the second spar are disposed within the blade body adjacent the periphery.

7. The rotor blade of claim 1, wherein the first spar notch and the second spar notch are aligned.

8. The rotor blade of claim 1, wherein the first spar notch and the second spar notch are staggered.

9. The rotor blade of claim 1, wherein the first spar is configured to fracture at the first frangible portion when a breaking force is applied to the rotor blade.

10. The rotor blade of claim 1, wherein the second spar is configured to fracture at the second frangible portion when a breaking force is applied to the rotor blade.

11. The rotor blade of claim 1, wherein the first spar elongate body is in continuous contact with the blade body and the second spar elongate body is in continuous contact with the blade body.

12. The rotor blade of claim 1, wherein the blade body defines a blade body geometry, and wherein the first frangible portion of the first spar defines a first geometry differing from the blade body geometry.

13. The rotor blade of claim 12, wherein the second frangible portion of the second spar defines a second geometry differing from the blade body geometry.

14. The rotor blade of claim 1, wherein the first spar elongate body includes a plurality of first spar notches spaced along the first spar elongate body and the second spar elongate body includes a plurality of second spar notches spaced along the first second spar elongate body.

15. The rotor blade of claim 14, wherein a number of notches in the plurality of first spar notches is a same number as a number of notches in the plurality of second spar notches.

16. The rotor blade of claim 14, wherein a number of notches in the plurality of first spar notches is a different number than a number of notches in the plurality of second spar notches.

17. The rotor blade of claim 14, wherein the plurality of first spar notches are equally spaced along the first spar elongate body.

18. The rotor blade of claim 14, wherein the plurality of first spar notches are unequally spaced along the first spar elongate body.

19. The rotor blade of claim 14, wherein the plurality of first spar notches define a first spacing between adjacent ones of the plurality of first spar notches, the plurality of second spar notches define a second spacing between adjacent ones of the plurality of second spar notches, and the first spacing differs from the second spacing.

20. The rotor blade of claim 1, wherein the rotor blade is positioned within one of a fan, a compressor section, or a turbine section.

\* \* \* \* \*